Sept. 29, 1942.　　　M. L. DAKE　　　2,296,909
SPREADER
Filed May 7, 1941　　　5 Sheets-Sheet 1

INVENTOR
Merrills L. Dake
BY
ATTORNEY

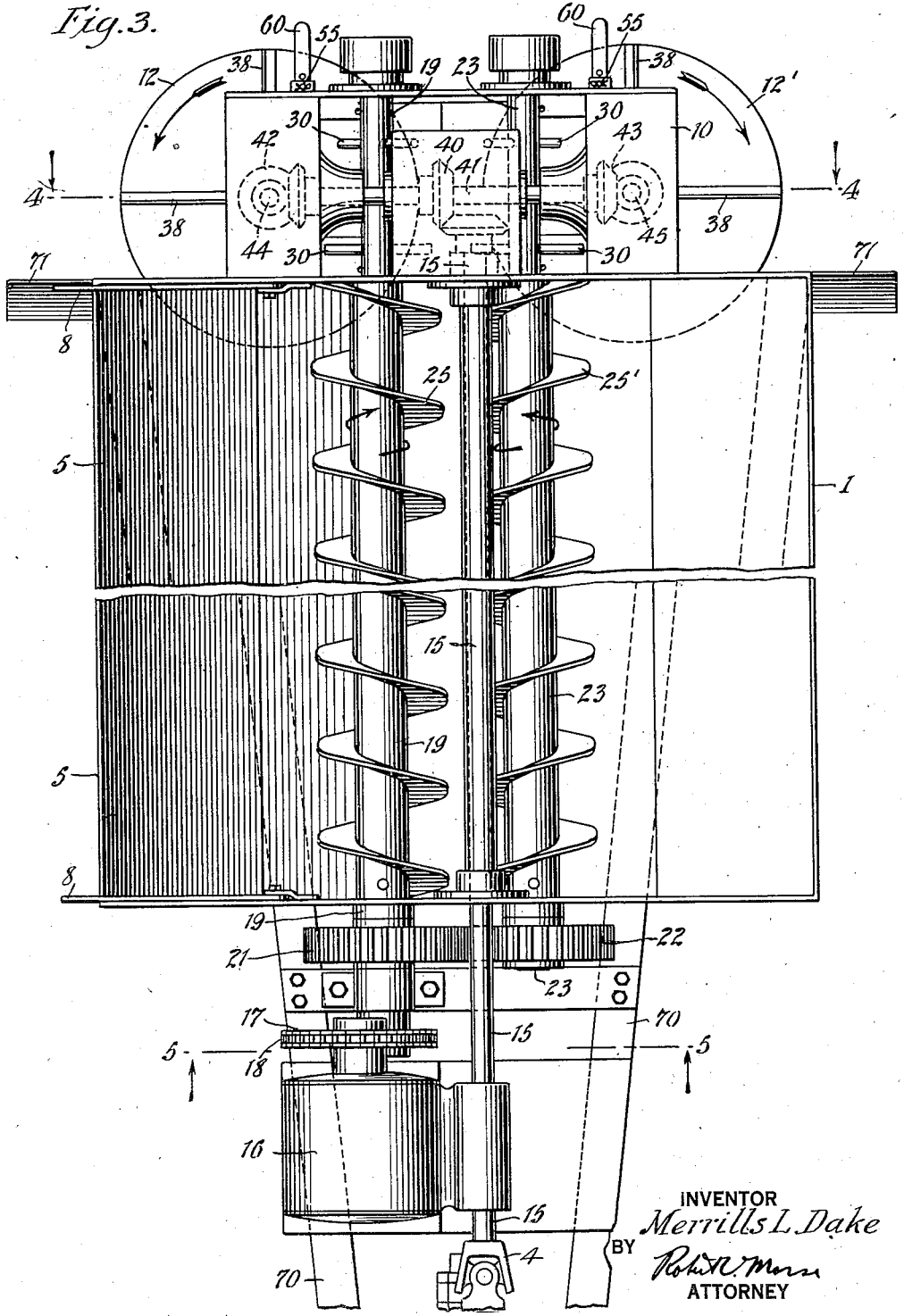

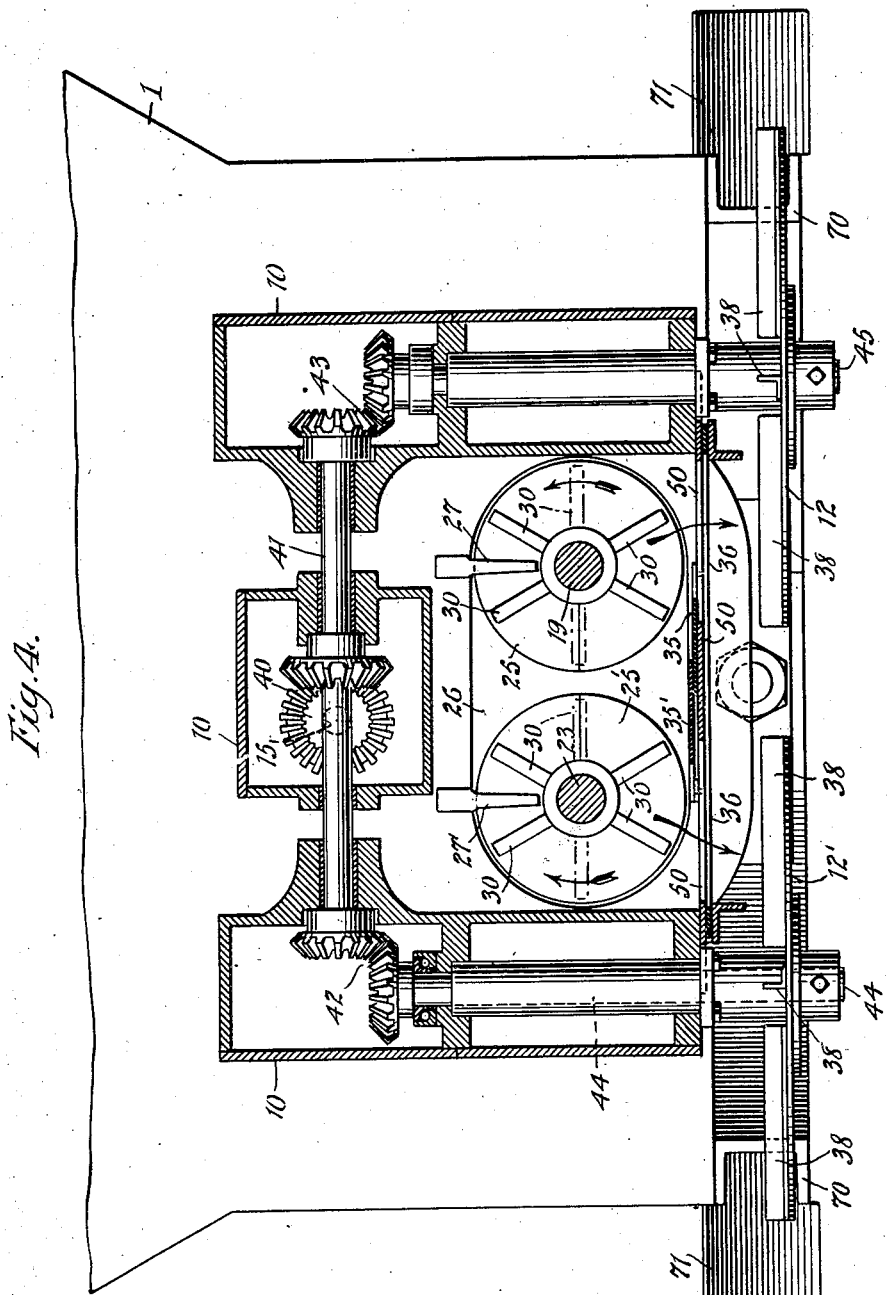

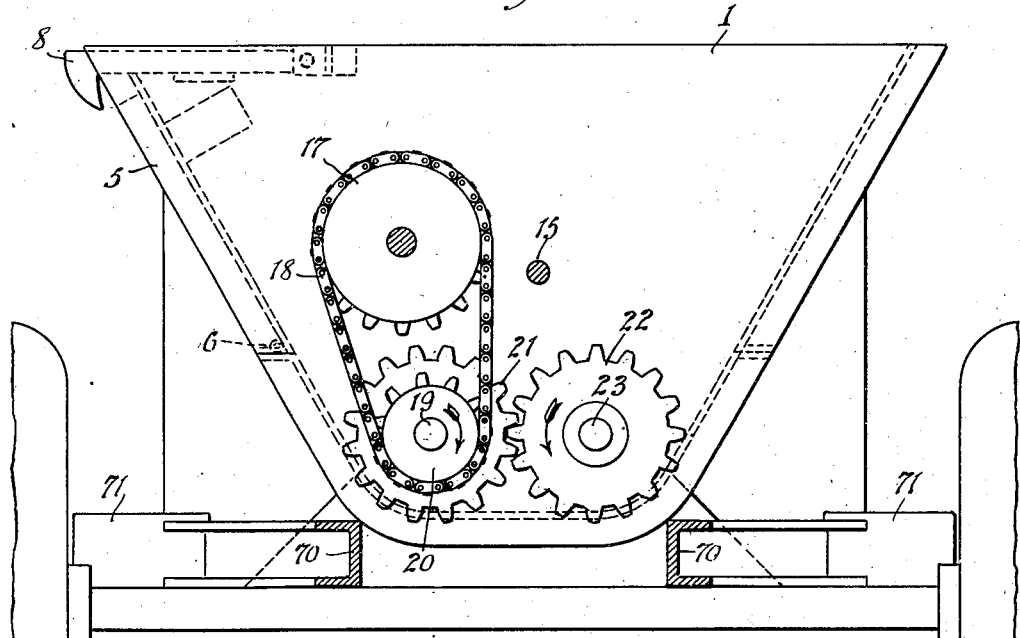
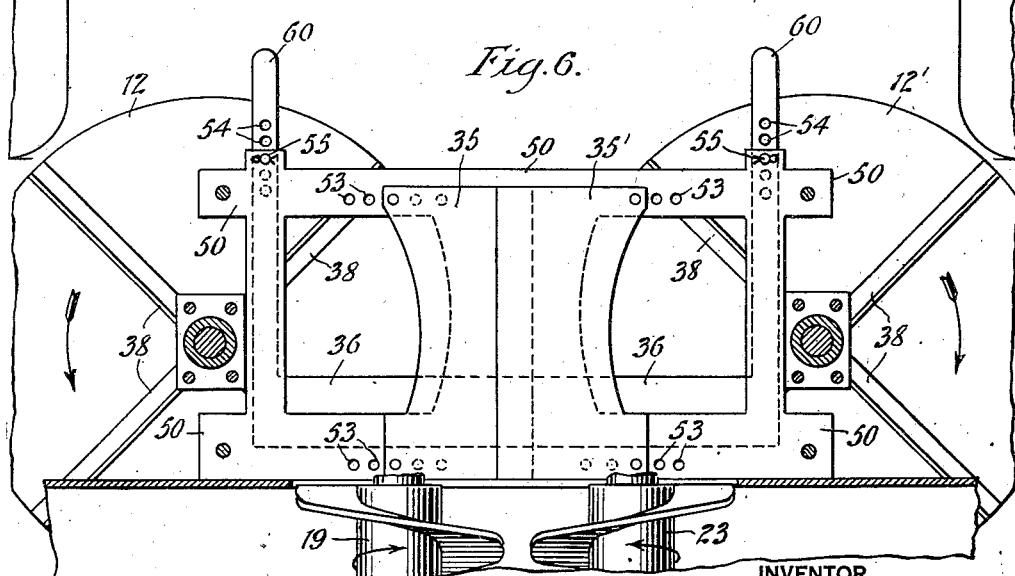

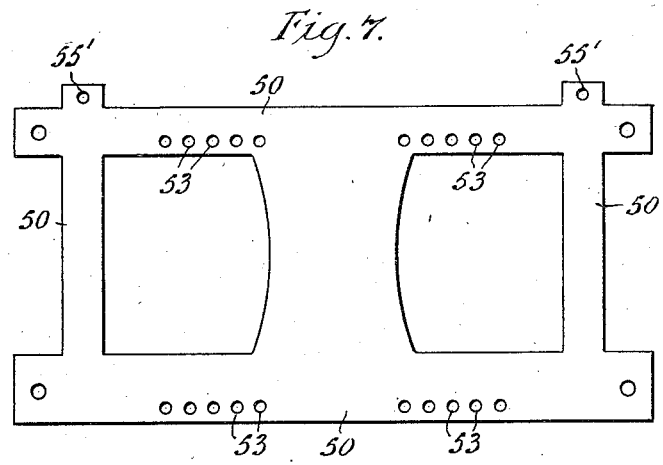
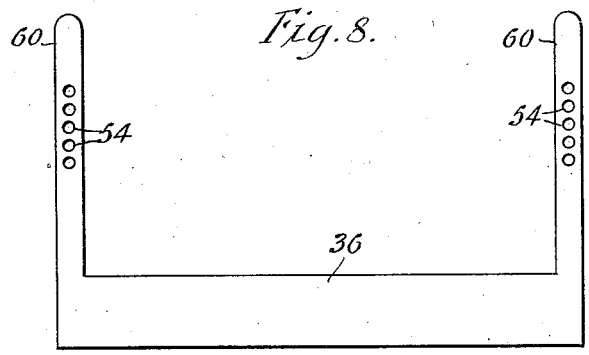
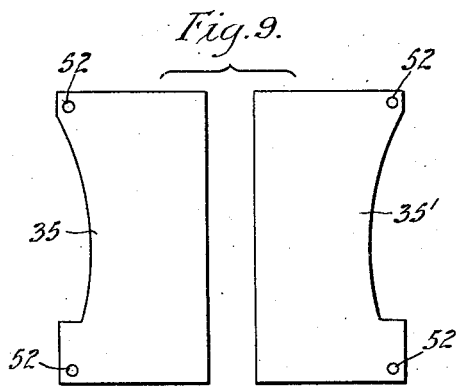

Patented Sept. 29, 1942

2,296,909

UNITED STATES PATENT OFFICE 2,296,909

SPREADER

Merrills L. Dake, Ithaca, N. Y., assignor to Cooperative Grange League Federation Exchange, Inc., Ithaca, N. Y., a corporation of New York Application May 7, 1941, Serial No. 392,329

5 Claims. (Cl. 275—2)

This invention relates to mechanical spreaders, such as are used to distribute lime, fertilizer, sand, or other such materials over the ground. These cannot generally be spread by hand with any great degree of uniformity. If the application of such materials is to be efficient, economical, and in scientific proportions, it is generally desirable that the distribution be controllable as to quantity and uniform in dispersion. It is also necessary that the breadth of the spread be adjustable, as some conditions of ground or crops require applications in narrow strips, while in others a wide broadcast may be desired.

The principal objects of the present invention are to provide greater control of the rate, spread, and density of application than has been effected in the past, in the interests of efficiency and economy; to provide a rugged type of mechanism capable of meeting the practical requirements of the various kinds of work to which such mechanisms are subjected; and to handle a wide variety of materials, fine or coarse, dry or wet, so as to extend the field of usefulness. In furtherance of these general objects, means are provided to easily adjust the rate of feed, and to break up the material if necessary before it reaches the distributers; to clear the conveyors and send the material down to the distributer disks thru orifices controllable in a wide variety of ways, both as to quantity and direction or extent of throw; to make the parts capable of standing the type of service they meet in practice, and to permit their ready adjustment and repair. Various other objects in connection with specific features will become apparent as the description proceeds.

Referring now to the drawings forming part of this specification,

Fig. 3 is a plan view of the mechanism.

Fig. 4 is a vertical cross-section looking forward, taken on the line 4—4 of Fig. 3.

Fig. 5 is a vertical cross-section taken on the line 5—5 of Fig. 3, looking toward the rear.

Fig. 6 is a detail plan view of the distributer disks and control gates, by which the quantity and direction of spread is regulated.

Fig. 7 is a detail plan view of the control gate frame.

Fig. 8 is a detail plan view of the longitudinal control gate.

Fig. 9 is a detail plan view of the transverse control gates.

Similar reference numerals refer to similar parts thruout the several views.

Figure 1:
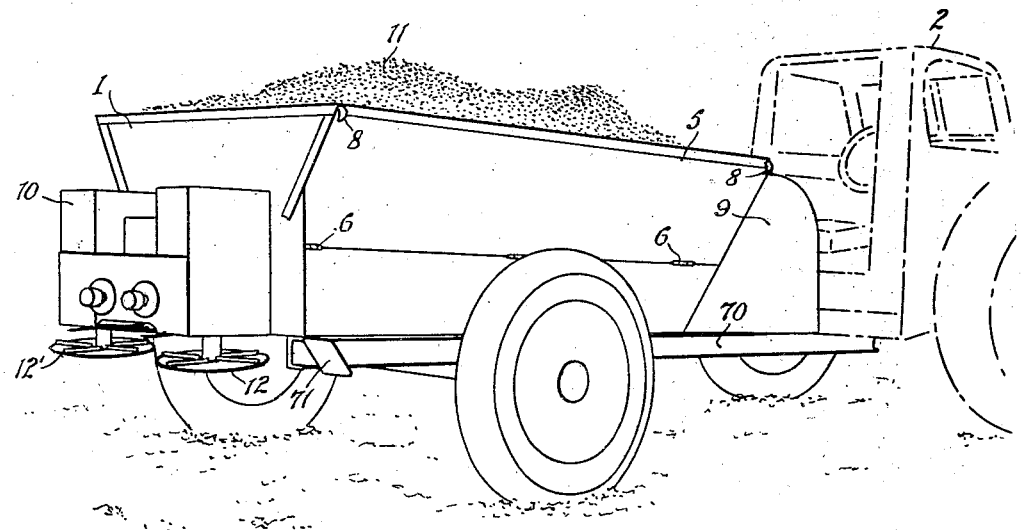
Fig. 1 is a perspective view of a typical trailer equipped with the invention, as viewed from the rear quarter, with sides of the body closed.
Figure 2:
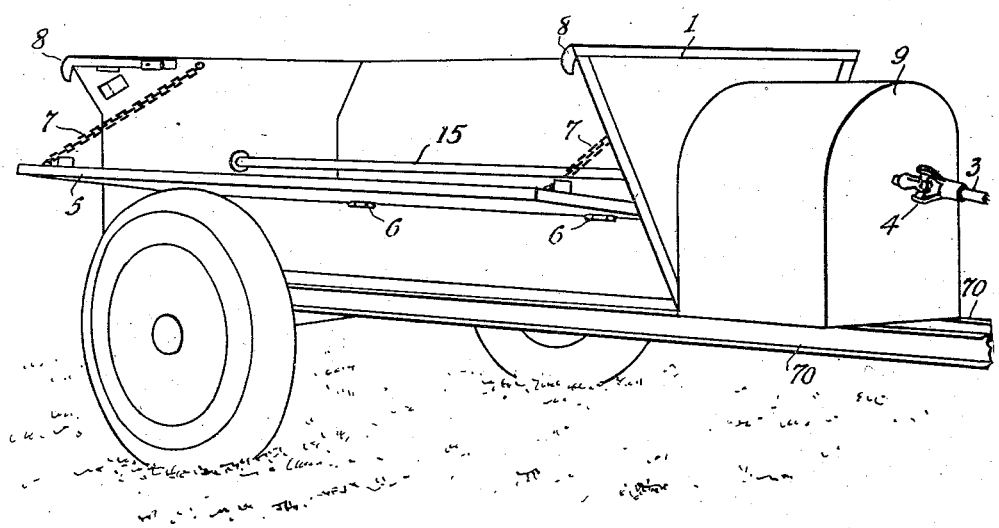
Fig. 2 is a perspective view of the same trailer as viewed diagonally from the front, with the side open.

Referring first to Fig. 1 and Fig. 2, the spreader mechanism is illustrated for example as applied to a trailer 1 which can be drawn by the tractor 2, which also supplies power to the spreader by means of the power shaft 3, thru the universal joint 4. While the spreader mechanism is shown as applied to a trailer, it will be understood that it can equally well be applied to a truck or unitary tractor, and that the power may be supplied from any suitable source. The side of the body 5 is hinged at 6 so that it can be opened for convenience of loading, or on occasion, unloading. The side 5 is held by the chains 7 and latches 8. At the forward end of the trailer the housing 9 encloses the reduction gear and change speed mechanism to be described later in connection with Fig. 3 and Fig. 5; and at the rear of the trailer is located the distributing mechanism 10 to be described later in connection with Figs. 3, 4, 6, 7, 8 and 9. The lime or other material to be distributed, indicated by the reference numeral 11, is loaded in the trailer 1, and after being operated upon by the various portions of the mechanism, is spread by the whirling disks 12, 12', on which the material falls; and is thrown in the quantities and directions desired thru the operation of special controls as will be described.

Referring now to Fig. 3, the power which reaches the mechanism from any suitable source, is transmitted thru the universal joint 4 to the drive shaft 15. Must truck or tractor engines are provided with power take-offs, which generally run at a constant speed, sufficiently high for mechanisms such as the distributer disks 12, 12', but too high for such devices as screw conveyors, where heavy torque is required. Accordingly a reduction gear box 16 is provided, driven from the shaft 15, and in turn driving the sprocket 17 at much reduced speed but with a more powerful torque.

Referring now to Fig. 5 as well as Fig. 3, the sprocket 17 carries the chain 18 which turns the shaft 19 by means of the sprocket 20. The spur gear 21 is secured to the shaft 19 and meshes with the spur gear 22 which is secured to the shaft 23. The sprockets 17, 20 and the chain 18 are removable and are employed for the purpose of providing a means for readily changing the speeds of the shafts 19 and 23 when in the field, to adapt the mechanism to various operating conditions without changing the speed of the power take-off or drive shaft 15. The reasons for adjusting these sprockets 17, 20 will become more apparent in connection with the description of the operation of the control gates and disks at the other end of the mechanism.

The shafts 19 and 23, rotating in opposite directions, turn a pair of corresponding conveyor screws 25 and 25' of opposite pitch arranged to force the contents of the body 5 to the rear. This contents is usually granular or pulverulent material, such as lime for example, which may be more or less caked or lumpy; and the two conveyor screws 25 and 25' turning in opposite directions, tend to agitate and grind the mass so as to work it into condition suitable for spreading. The inclined sides of the body 5 cause the material to gravitate to the region of the conveyor screws 25, 25' so that it will all be acted upon.

The material to be spread is forced out the rear end of the body by the conveyor screws 25, 25', thru the opening 26 which may best be seen by reference to Fig. 4, which is a view from the back. As the material passes thru the opening 26, scraper pins 27, 27' secured to the back of the body 5, cut thru the emerging mass, free it from the conveyor screws, and help to break up any lumps present. The breaking up process is continued by the action of three rows of pins 30 on each of the shafts 19 and 23, spaced approximately equidistant axially and in thirds circumferentially. Only two sets of these appear in Fig. 4 as that view is partly in section on the line 4—4 of Fig. 3.

The material to be spread then drops in the general direction of the downward pointing arrows of Fig. 4, thru openings in the control gates 35, 35' and 36, and falls on the distributing disks 12 and 12'. These disks 12 and 12' are provided with vanes 38 and are rotated at high speed from power supplied by the drive shaft 15. The rotation of the shaft 15 turns the bevel gears 40 driving the cross-shaft 41. This, thru the bevel gears 42 and 43, turns the shafts 44 and 45 respectively, on which the disks 12 and 12' are fastened. The disks 12 and 12' are thus rotated rapidly in opposite directions, as indicated by the arrows in Fig. 3. As the material to be spread falls on the disks 12 and 12' it is struck by the vanes 38 and thrown centrifugally in directions depending on the points at which it has fallen on the disks.

In order to control the direction of spread, as well as its quantity, the gates 35, 35' and 36 are provided. These are of special construction, in order to permit a great variety of adjustments in both density and scope of spread.

Referring now to Fig. 6, Fig. 7, Fig. 8 and Fig. 9, the gates 35, 35' and 36 are mounted on the frame 50, which is located under the discharge end of the conveyors 25, 25' at the rear end of the mechanism. The gates 35 and 35' have pins 52 welded to them (see Fig. 9) which fit into holes 53 in the frame 50 to position the gates 35, 35' for any desired opening in a transverse direction. The gate 36 is provided with holes 54 into which bolts or pins 55 may be placed (see Fig. 3 or Fig. 6) passing thru holes 55' in the frame 50 to lock the gate 36 in any desired longitudinal position. The gates 35, 35' thus are adjustable in directions at right angles to gate 36. Rearwardly extending handles 60 are provided on the gate 36 to facilitate its manipulation.

Now referring to Fig. 6, it will be seen that by moving the gate 36 backward, that is, upward in the drawings, by pulling on the handles 60, the material passing thru the gates will fall upon the revolving disks 12, 12' at later points in their rotation. Consequently the material will be thrown off the disks at a later point, causing a wider spread. The volume can be made the same by moving the gates 35, 35' to increase the opening as the adjustment of the gate 36 decreases it. When a narrow spread is desired, more directly behind the tractor, the gate 36 is pushed in or forward. This shifts the opening to a location where the disks 12, 12' pick up the material earlier in their rotation and consequently cast it more directly backward. The gates 35, 35' can also be moved in toward the axes of their respective distributor disks 12, 12', to both vary the quantity and change the direction of application. Various combinations of settings of the gates 35, 35' and the gate 36 can thus be used. The spread is also controllable by varying the speed of rotation of the disks 12, 12' relative to the amount of material fed by the screw conveyors 25, 25' and the speed of travel of the tractor or trailer. This is adjusted by changing the sprockets 17 and 20 of the chain drive 18, as before mentioned, and also by running the tractor at different speeds.

It will be seen that the amount and direction of spread is controllable by varying the combination of three variables, the transverse feed gates, the longitudinal feed gates, and the speed of conveyor or travel. This provides a flexibility of action which permits the device to be adapted to a wide variety of uses, from the scientific application of rather closely calculated amounts of lime or fertilizer to heavy duty with sand or cinders on winter roads. In going thru orchards or other crops where relatively narrow belts are laid between rows, the material can be laid directly behind the trailer; while on other crops a very broad spread can be obtained. With a little experience the operator can learn by trial what combination of longitudinal and transverse gate openings and what sprockets and driving speeds give the result desired in each particular instance.

In order that the spreaders may stand up under the rough usage to which they are generally subjected in practice, the parts are ruggedly constructed and combine structural simplicity with the desired flexibility of function. The main body 5 is mounted on two rigid beams 70 converging toward the front, and fastened at the rear to the cross-beam 71.

While I have in the foregoing described certain specific examples, it will be understood that they are merely for purposes of illustration to make clear the principles of the invention, which is not limited to the particular forms shown, but is susceptible to various modifications and adaptations in different installations as will be apparent to those skilled in the art, without departing from the scope of the invention as stated in the following claims.

I claim:

1. In a spreader, the combination of a body, a drive shaft passing thru the body and extending beyond the body at both ends, a reduction gear driven by said shaft and located in front of the body, a chain drive connected to the reduction gear, a conveyor worm and shaft operated by said chain drive, a pair of gears also operated by said chain drive, a second conveyor worm and shaft driven by said pair of gears in a direction of rotation opposite to that of the first mentioned conveyor worm, both worms being located longitudinally in the bottom portion of the body and having screws of opposite pitch arranged to force the material to be spread toward the rear of the body, said body having an opening at the rear thru which said material may pass, scraper pins at said opening to free the emerging material, breaker pins on the rear of the conveyor worm shafts, a pair of rotary distributer disks, gearing connecting the drive shaft to the disks, a pair of transversely adjustable gates and a longitudinally adjustable gate whereby the resultant gate opening can be adjusted to different radial and circumferential positions over the disks to control the direction and amount of spread.

2. In a spreader, the combination of a body having an opening, screw conveyors turning in opposite directions arranged to force the material to be spread toward the rear of the body and thru said opening, scraper pins attached to the body to clear the material leaving the conveyor screws, a pair of rotating distributers, transversely adjustable gates over the distributers, a longitudinally adjustable distributer gate cooperating with the transverse gates to control the location and amount of the material falling on the rotary distributers, whereby the direction and amount of spread can be regulated.

3. In a spreader, the combination of a body, a pair of distributer disks at the rear of said body, vanes on the upper sides of said disks, means for adjusting transversely the location at which the material to be spread falls on said disks, means for adjusting longitudinally the location at which said material falls on said disks, whereby the combined action of the transverse and longitudinal adjusting means varies the amount and direction of the spread, and screw conveyor means for feeding said material to said disks.

4. In a spreader, the combination of a body, distributer disks at the rear of said body, means for feeding material to be spread from the body to the distributer disks, a gate frame between said means and said disks, said frame having gate openings over said disks, transversely adjustable gates for adjusting the openings radially in relation to the axes of the disks, and a longitudinally adjustable gate cooperating with the transversely adjustable gates to adjust the location of fall in the cycle of rotation of the disks, whereby both the amount and direction of spread may be regulated.

5. In a spreader, the combination of a body, a pair of distributer disks at the rear of said body, means for feeding the material to be spread from the body to the distributer disks, a gate frame between said means and said disks, said gate frame having gate openings and adjustment holes, a pair of transversely adjustable gates having pegs fitting in said holes whereby said gates may be set at various positions radially relative to the centers of the distributer disks, and a longitudinally adjustable gate cooperating with the transverse gates to vary the gate opening in a longitudinal direction, said longitudinal gate having a pair of rearwardly projecting handles by which it can be operated, and means for locking said longitudinal gate in various positions relative to the gate frame.

MERRILLS L. DAKE.